United States Patent [19]

Tanaka et al.

[11] 4,250,280
[45] Feb. 10, 1981

[54] THERMOPLASTIC BLOCKCOPOLYETHERESTER COMPOSITION HAVING IMPROVED THERMAL STABILITY

[75] Inventors: Chiaki Tanaka, Chita; Nagayoshi Naito; Yoko Furuta, both of Nagoya, all of Japan

[73] Assignee: Toray Industries, Inc., Tokyo, Japan

[21] Appl. No.: 38,066

[22] Filed: May 11, 1979

[30] Foreign Application Priority Data

May 26, 1978 [JP] Japan .................................. 53/62301

[51] Int. Cl.$^3$ ........................ C08L 67/00; C08L 81/00
[52] U.S. Cl. .................................... 525/437; 525/400; 525/449; 525/533; 525/535
[58] Field of Search ............... 525/437, 535, 499, 449, 525/389, 398, 400, 533

[56] References Cited

U.S. PATENT DOCUMENTS

| | | | |
|---|---|---|---|
| 3,813,368 | 5/1974 | Villa | 525/437 |
| 3,891,604 | 6/1975 | Wolfe, Jr. | 528/301 |

*Primary Examiner*—J. Ziegler
*Attorney, Agent, or Firm*—Miller & Prestia

[57] ABSTRACT

Disclosed is a blockcopolyetherester composition stabilized by the incorporation of a polysulfide polymer. Products prepared from this composition exhibit an excellent thermal stability as well as UV-light resistance.

14 Claims, No Drawings

THERMOPLASTIC BLOCKCOPOLYETHERESTER COMPOSITION HAVING IMPROVED THERMAL STABILITY

BACKGROUND OF THE INVENTION (1) Field of the Invention

The present invention relates to a polymer composition comprising a blockcopolyetherester elastomer. More particularly the present invention relates to a polymer composition comprising a blockcopolyetherester and a specific stabilizer, which affords an extremely improved resistance to thermal exposure.

(2) Description of the Prior Art

It is well known that a blockcopolyetherester composed of polyether soft segments and polyester hard segments shows elastomeric properties and is suitable for fibers, films and molding articles. A blockcopolyetherester, however, contains polyether segments, which are subject to oxidative decomposition followed by coloring and decrease of mechanical properties. Especially the oxidative degradation is accellerated by UV-irradiation or thermal exposure. Therefore utilization of blockcopolyetherester is restricted to some extent.

In order to improve these defects of a blockcopolyetherester, incorporation of various stabilizers have been proposed, but no sufficiently effective stabilizer has been discovered. Although hindered phenols can be considered one of the most economically successful of the known stabilizers for blockcopolyetheresters, they tend to migrate to the surface of molded articles, and thereby the stabilization effects are gradually decreased. Aromatic amines having a more improved stabilization effect make the polymer stain.

Thus, an object of the present invention is to provide a specifically stabilized blockcopolyetherester using a stabilizer which does not cause migration to the surface and discoloring.

SUMMARY OF THE INVENTION

According to this invention there is provided an improved copolyetherester composition which has greatly enhanced resistance toward thermal degradation of the polymer, particularly after prolonged exposure to elevated temperatures.

This improvement is accomplished by incorporating a specific polysulfide polymer into the blockcopolyetherester.

The copolyetherester which is to be improved by the instant invention consists essentially of a multiplicity of recurring intralinear long chain polyether soft segments and short chain polyester hard segments, said long chain polyether soft segments having a molecular weight of between 200 and 6,000, with the short chain polyester units constituting about 15-90% by weight of the blockcopolyetherester and the long chain polyether units constituting about 85-10% by weight of the blockcopolyetherester.

DETAILED DESCRIPTION OF THE INVENTION

The blockcopolyetheresters used in accordance with this invention are prepared by polymerizing with each other (a) one or more dicarboxylic acids, (b) one or more low molecular weight diols, and (c) one or more long chain polyether glycols.

Dicarboxylic acids which react to form the polyester hard segments are aliphatic, cycloaliphatic, or aromatic dicarboxylic acids.

Representative aromatic dicarboxylic acids which can be used include terephthalic, isophthalic and phthalic acids, bi-benzoic acid, substituted dicarboxy compounds with two benzene nuclei such as bis(p-carboxyphenyl) methane, p-oxy(p-carboxyphenyl)benzoic acid, 2,6-naphthalene dicarboxylic acid, 1,5-naphthalene dicarboxylic acid, anthracene dicarboxylic acid and 4,4'-sulfonyl dibenzoic acid.

Representative aliphatic and cycloaliphatic acids which can be used for this invention are 1,4-cyclohexane dicarboxylic acid, 4,4'-dicyclohexyl dicarboxylic acid, cyclopentane dicarboxylic acid, 1,3-cyclopentane dicarboxylic acid, adipic acid, sebacic acid, azelaic acid and dimeric acid.

Aromatic dicarboxylic acids are an especially preferred class for preparing the polyetherester polymers of this invention because of their mechanical properties and thermal resistance. It may be preferred that more than about 50 mol % of the dicarboxylic acid is aromatic. The most preferable aromatic dicarboxylic acid is terephthalic acid.

Diols which are reacted with the foregoing dicarboxylic acids to produce the blockcopolyetheresters used in this invention are aliphatic, cycloaliphatic and aromatic dihydroxy compounds. Preferred are diols with 2-15 carbon atoms such as ethylene, propylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxynaphthalene, bis(p-hydroxy)-biphenyl, bis(p-hydroxyphenyl)methane and bis(p-hydroxyphenyl) propane, etc. Especially preferred are aliphatic or alicyclic diols containing 2-8 carbon atoms.

The long chain glycols used to prepare the soft segments of these copolyetheresters have a molecular weight of about 200 to 6,000. Suitable long chain glycols which can be used in preparing the soft segments of the copolymers include poly(alkylene ether)glycols in which the alkylene groups are of 2 to 9 carbon atoms such as poly(ethylene ether)glycol, poly(1,2- and 1,3-propylene ether)glycol, poly(tetramethylene ether)glycol, poly(1,2-butylene ether)glycol, poly(pentamethylene ether)glycol, poly(hexamethylene ether)glycol, poly(heptamethylene ether)glycol, poly(octamethylene ether)glycol, poly(nonamethylene ether)glycol, and random or block copolymers thereof, for example, glycols derived from ethylene oxide and 1,2-propylene oxide, and random or block copolymers of tetrahydrofuran with ethylene oxide or 3-methyltetrahydrofuran. The most preferred long chain glycols for preparation of the segmented copolyetherester are poly(tetramethylene ether)glycol and mixtures thereof.

The blockcopolyetheresters described herein can be conveniently prepared by a conventional ester-interchange or direct-esterification reaction. A preferred example involves heating the dicarboxylic acid, e.g, dimethyl ester of terephthalic acid with a long chain glycol, e.g, poly(tetramethylene ether)glycol having a molecular weight of about 200–6,000 and a molar excess of diol, e.g., 1,4-butanediol in the presence of the usual ester-interchanging catalyst at about 150°–260° C., while distilling off methanol formed by the ester-interchange. The resulting prepolymer is then carried to the desired molecular weight polymer by the distillation of an excess 1,4-butanediol under 5 mm Hg at 200°–270° C.

The polyetherester prepolymer can also be prepared by the direct-esterification of dicarboxylic acids with long chain glycols and molar excess of short chain diols in the presence of an esterification-catalyst. A well-known ester-interchanging, esterification or polycondensation catalyst can be used, but organic titanates such as tetrabutyl titanate or tetrabutylenediol titanate are preferably employed alone or in combination with a stannous compound.

Polyfunctional compounds such as trimellitic anhydride, pyromellitic anhydride, 1,3,5-benzene-tricarboxylic acid, pentaerythritol, or glycerol which copolymerize into the copolyetherester to produce a partial chemical branching or crosslinking, may optionally be used.

The blockcopolyetherester is modified by the presence of an effective amount of a specific polysulfide polymer.

The general formula for the polysulfide polymer is as follows:

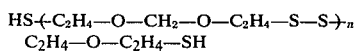

wherein n is a integer of from 4 to 100. When n is too large, compatibility of the polysulfide polymer with block-copolyetherester is insufficient. On the contrary, when n is too small, processability in the compounding process is disadvantageous because of the low melt viscosity of the polysulfide. In both cases, the polysulfide polymer can exhibit only poor stabilization effects. This type of polysulfide polymer may be commercially obtained from Toray Thiokol, Inc. under the trade name of "Thiokol" LP-32 (Registered trade mark). n of "Thiokol" LP-32 is 23.

The amount of the polysulfide polymer incorporated is 0.05 to 30 parts by weight, preferably 0.1 to 20 parts by weight based on 100 parts by weight of the block-copolyetherester. The most preferred copolyetherester composition includes 0.3 to 2.0 parts by weight of a polysulfide polymer, which provides the best stabilized properties without coloring and decreasing the physical properties and processability.

The polysulfide polymer may be incorporated with the blockcopolyetherester either before, during or after the preparation of the copolyetherester. For best results, the polysulfide polymer must be thoroughly and uniformly melt-blended after the preparation of the copolyetherester.

The resulting product stabilized under the instant invention has improved resistance to oxidative degradation at a temperature higher than 120° C. for extended period of time. The composition also exhibits improved resistance to light or UV-irradiation. Since the composition of this invention is hardly discolored in molding process, it is useful for white or light color shaped products.

In comparison with the previously known stabilizers, the polysulfide polymer in this invention shows superior stabilization effects as follows:

Hindered phenol anti-oxidants easily bleed out from the polymer compositions, which results in the deposition of powder on the surface of the molded articles, and shows the stabilization effect only for extremely short periods. Aromatic amines show a superior stabilization effect over the hindered phenols, but they have the disadvantage of yellowing during storage or aging.

The previously known stabilizers have at least one of the following defects: poor compatibility with the blockcopolyetherester, easily bleeding out, inferior processability owing to low melt-viscosity during the melt blending process, and discoloring. The composition in the present invention shows an extremely improved resistance to heat and light, and also has characteristics which obliterate the above defects.

It is possible to incorporate a small amount of a conventional stabilizer along with the polysulfide polymer. These heat or UV light stabilizers may have the above mentioned defects, but this does not create serious problems if the stabilizers are only added in small amounts. The stabilization effect that results when the stabilizer is added along with the polysulfide polymer may be due to synergism.

Representative thermal stabilizers which can be used together with the polysulfide polymer include hindered phenols such as 4,4'-bis(2,6-ditertiary-butylphenol), 1,3,5-trimethyl-2,4,6-tris(3,5-ditertiary-butyl-4-hydroxybenzyl)benzene, tetraxis[methylene-3(3,5-ditertiary-butyl-4-hydroxyphenyl)propionate]methane, N,N'-hexamethylene-bis(3,5-ditertiary-butyl-4-hydroxynydrocinnamoylamide), aromatic amines such as N,N'-bis($\beta$-naphthyl)-p-phenylenediamine, 4,4'-bis($\alpha,\alpha$-dimethylbenzyl)diphenylamine, sulfur containing compounds such as dilauryl thiodipropionate, phosphor containing compounds, alkaline earth metal oxides, nickel salts or complexes of certain Schiff bases in which the Schiff base is essentially that formed by the condensation of salicyl aldehyde and a substituted aromatic amine such as substituted aniline or amine pyridine. Representative stabilizers to ultraviolet light which can be used together with the polysulfide polymer include substituted benzophenones, benzotriazoles and piperidine compounds such as bis(2,2,6,6-tetramethyl-4-piperidine)sebacate and 4-benzoyloxy-2,2,6,6-tetramethylpiperidine.

A preferable blockcopolyetherester composition of the present invention contains both a polysulfide polymer and a certain hindered phenol or aromatic amine. It may be preferred that a small amount of hindered phenol or amine is added during the polycondensation aspect in the preparation of the blockcopolyetherester, and then the polysulfide polymer is blended with the blockcopolyetherester product after the completion of polymerization.

Properties of these stabilized copolyetherester compositions can also be modified by incorporation of various conventional fillers, plasticizers, lubricants, pigments, nucleating agents, mold-release agents, antistatic agents, fire-retardants, electrical conductors, hydrolytic stabilizers and other thermoplastics.

The following examples are set forth in illustration of this invention and should not be construed as a limitation thereof.

In the Examples, all parts and percentages are by weight unless otherwise indicated, and inherent viscosities of the polymer are measured at 30° C. at a concentration of 0.5 weight percent in o-chlorophenol.

EXAMPLE

Polymer A

In a glass flask having a stainless steel stirrer with a helical ribbon type screw, 94.5 parts of dimethyl terephthalate, 41.5 parts of dimethyl isophthalate, 77.0 parts of poly(tetramethylene oxide) glycol having a molecular weight of about 1,000 and 94.5 parts of 1,4-butanediol were placed in the presence of 0.10 parts of tetrabutyl titanate. The mixture was heated with stirring at 210° C. for 2 hours to distil off methanol from the reaction system. The recovered methanol was 42.6 parts of theoretical weight. After adding 0.40 parts of Irganox 1098 to the reaction mixture, the reaction temperature was raised to 245° C. and the pressure on the system reduced to 0.2 mm Hg for a period of 50 mixtures. Polymerization was continued for 2 hours under these conditions. The obtained polyetherester(A) has a melting point of 162° C. and an inherent viscosity of 0.98.

Polymer B

Polyetherester(B), having a melting point of 208° C. and an inherent viscosity of 1.2 was prepared by substantially the same procedure from the following materials:

|  | Parts |
|---|---|
| Dimethyl terephthalate | 194 |
| Poly(tetramethylene oxide) glycol: number average molecular weight about 2,000 | 300 |
| 1,4-Butanediol | 135 |
| Tetrabutyl titanate | 0.12 |

Polymer C

Polyetherester(C), having a melting point of 210° C. and an inherent viscosity of 1.3, was prepared in a similar manner as above from the following materials:

|  | Parts |
|---|---|
| Dimethyl terephthalate | 48.4 |
| Poly(tetramethylene oxide)glycol: number average molecular weight about 2,000 | 110 |
| Ethylene glycol | 44.0 |
| Zinc acetate | 0.080 |
| Gernanium oxide | 0.048 |

EXAMPLE 1

To 100 parts of polyetherester(A) were added the polysulfide polymer as illustrated in the following formula (n=23);

$$HS-(C_2H_4-O-CH_2-O-C_2H_4-S-S)_n-C_2H_4-O-C_2H_4-SH$$

which are sold under the trademark of Thiokol® LP-32 and/or 0.5 or 1.0 part of antioxidants illustrated in Table 1, and the blends were injection-molded into square sheets of 1 mm thickness.

ASTM No. 3 dumbbell shaped test specimens were cut from the above sheets and heat aged at 140° C.; and the decrease of elongation at break of test specimens was then followed. The half retention time of elongation at break were summerized as thermal resistant time in Table 1.

The antioxidants used for the polymer compositions of Runs 4–12 are outside of the scope of this invention and are included only for comparison.

EXAMPLE 2

Into 100 parts of polyetherester(B) or (C) were incorporated thermal stabilizers illustrated in Table 2, and dumbbell specimens were prepared by the same procedure as shown in Example 1. Test specimens of all compositions were heat aged at both 130° C. and 140° C., and thermal resistant time were determined in terms of half retention time of elongation at break. The antioxidants used in Runs 6–10 are outside of the scope of this invention and are included only for comparison.

EXAMPLE 3

Into 100 parts of polyetherester(A) were incorporated some proportions of the stabilizers described in Table 3, and dumbbell shaped test specimens were prepared by the same procedure as shown in Example 1. Test specimens of all compositions were subjected to aging test against UV-light in a Fade-O-Meter at 50° C., and the decrease of elongation at break of test specimens was followed. Half retention time of that is summerized in Table 3.

TABLE 1

|  | Run No. | Post Added Antioxidant | Added Parts | Thermal Resistant Time (HR) |
|---|---|---|---|---|
| This Invention | 1 | "Thiokol" LP-32 | 0.5 | 630 |
| This Invention | 2 | "Thiokol" LP-32 | 1.0 | 860 |
| This Invention | 3 | "Thiokol" LP-32 Tetraxis[methylene-3(3,5-ditertiary-butyl-4-hydroxy-phenyl)propionate]methane | 0.5 0.5 | 980 |
| Control | 4 | Tetraxis[methylene-3(3,5-ditertiary-butyl-4-hydroxy-phenyl)propionate]methane | 0.5 | 140 |
| Control | 5 | Tetraxis[methylene-3(3,5-ditertiary-butyl-4-hydroxy-phenyl)propionate]methane | 1.0 | 220 (breed out) |
| Control | 6 | 2,2'-Thiodiethylbis[3-(3,5-ditertiary-butyl-4-hydroxyphenyl)propionate] | 0.5 | 130 |
| Control | 7 | n-Octadecyl-3(4'-hydroxy-3',5'-ditertiary-butylphenyl)propionate | 0.5 | 110 |
| Control | 8 | di-n-Octadecylester of 3,5-ditertiary-butyl-4-hydroxybenzyl phosphoric acid | 0.5 | 80 |
| Control | 9 | 1,3,5-trimethyl-2,4,6-tris(3,5-ditertiary-butyl-4-hydroxybenzyl)benzene | 0.5 | 83 |
| Control | 10 | 1,3,5-trimethyl-2,4,6-tris(3,5-ditertiary-butyl-4-hydroxybenzyl)benzene | 1.0 | 125 |
| Control | 11 | N,N'-bis(β-naphthyl)-p-phenylenediamine | 1.0 | 360 (dark brown) |
| Control | 12 | 4,4'-bis(α,α-dimethylbenzyl)diphenylamine | 1.0 | 300 (dark brown) |
| Control | 13 | None | — | 24 |

TABLE 2

| | Run No. | Polymer | Thermal Stabilizer | Thermal Stabilizer Level (parts) | Thermal Resistant Time (HR) 130° C. | Thermal Resistant Time (HR) 140° C. |
|---|---|---|---|---|---|---|
| This Invention | 1 | B | Polysulfide Polymer (n = 23) | 0.5 | 1,000 | 550 |
| This Invention | 2 | C | Polysulfide Polymer (n = 23) | 0.5 | 860 | 410 |
| This Invention | 3 | B | Polysulfide Polymer (n = 50) | 0.5 | 1,000 | 520 |
| This Invention | 4 | B | Polysulfide Polymer (n = 23) | 2.0 | 1,000 | 830 |
| This Invention | 5 | B | Polysulfide Polymer (n = 23) Tetraxis[methylene-3(3,5-ditertiary-butyl-4-hydroxy-phenyl)propionate]-methane | 0.5 0.5 | 1,000 | 850 |
| Control | 6 | B | Tetraxis[methylene-3(3,5-ditertiary-butyl-4-hydroxy-phenyl)propionate]-methane | 0.5 | 280 | 105 |
| Control | 7 | B | Tetraxis[methylene-3(3,5-ditertiary-butyl-4-hydroxy-phenyl)propionate]-methane | 2.0 | 330 (breed out) | 120 (breed out) |
| Control | 8 | C | Tetraxis[methylene-3(3,5-ditertiary-butyl-4-hydroxy-phenyl)propionate]-methane | 0.5 | 180 | 75 |
| Control | 9 | B | Dilauryl thiodipropionate | 0.5 | 120 | 46 |
| Control | 10 | B | Dilauryl thiodipropionate Tetraxis[methylene-3(3,5-ditertiary-butyl-4-hydroxy-phenyl)propionate]-methane | 0.5 0.5 | 910 | 350 |

TABLE 3

| | Run No. | Post Added Stabilizer | Stabilizer Level (Parts) | Half Retention Time of Elongation at Break (HR) |
|---|---|---|---|---|
| This Invention | 1 | Polysulfide Polymer (n = 23) 2(2'-Hydroxy-3',5'-di-tertiary-butylphenyl)-5-chloro-benzotriazol | 0.2 0.5 | 220 |
| This Invention | 2 | Polysulfide Polymer (n = 23) 2(2'-Hydroxy-3',5'-di-tertiary-butylphenol)-5-chloro-benzotriazol | 0.5 0.5 | 490 |
| Control | 3 | 2(2'-Hydroxy-3',5'-di-tertiary-butylphenyl)-5-chlorobenzotriazole | 0.5 | 72 |
| Control | 4 | 2(2'-Hydroxy-3',5'-di-tertiary-butylphenyl)-5-chlorobenzotriazole | 1.0 | 120 |
| Control | 5 | 2(2'-Hydroxy-3',5'-di-tertiary-butylphenyl)-5-chlorobenzotriazole Tetraxis[methylene-3(3,5-ditertiary-butyl-4-hydroxyphenyl)propionate]methane | 0.5 0.5 | 96 |

What we claim is:

1. A thermoplastic blockcopolyetherester composition which comprises
   (A) a blockcopolyetherester consisting essentially of a multiplicity of recurring intralinear long chain polyether soft segments and short chain polyester hard segments, said long chain polyether soft segments having a molecular weight of between 200 and 6,000, with and the short chain polyester units constituting about 15 to 90% by weight of the blockcopolyetherester and the long chain polyether units constituting about 85 to 10% by weight of the blockcopolyetherester, and
   (B) an effective amount of polysulfide represented by the general formula

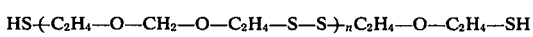

HS-(-C₂H₄—O—CH₂—O—C₂H₄—S—S-)ₙC₂H₄—O—C₂H₄—SH wherein n is an integer of 4 to 100.

2. A thermoplastic blockcopolyetherester composition of claim 1, wherein the amount of the polysulfide is 0.05 to 30 parts by weight per 100 parts of the blockcopolyetherester.

3. A thermoplastic blockcopolyetherester composition of claim 1, wherein the amount of the polysulfide is 0.1 to 20 parts by weight per 100 parts by weight of the blockcopolyetherester.

4. A thermoplastic blockcopolyetherester composition of claim 1, wherein the amount of the polysulfide is 0.3 to 2.0 parts by weight per 100 parts by weight of the blockcopolyetherester.

5. A thermoplastic blockcopolyetherester composition of claim 1, wherein said short chain polyester units of the blockcopolyetherester(A) comprise polycondensation products from the dicarboxylic acid component selected from the group consisting of aromatic, aliphatic and alicyclic dicarboxylic acids having a carbon number of 6 to 20, and diol component selected from the group consisting of alkylene and cycloalkylen glycols having a carbon number of 2 to 8.

6. A thermoplastic blockcopolyetherester composition of claim 5, wherein more than 50 mol % of said dicarboxylic acid is aromatic dicarboxylic acid.

7. A thermoplastic blockcopolyetherester composition of claim 5, wherein more than 50 mol % of said dicarboxylic acid is terephthalic acid.

8. A thermoplastic blockcopolyetherester composition of claim 1, wherein said long chain polyether units of the blockcopolyetherester(A) are polyalkylenether.

9. A thermoplastic blockcopolyetherester composition of claim 8, wherein said polyalkylenether is composed of an alkylen group having 2 to 9 carbon atoms.

10. A thermoplastic blockcopolyetherester composition of claim 8, wherein said polyalkylenether is poly(tetramethylen ether) glycol.

11. A thermoplastic blockcopolyetherester composition of claim 5 wherein said aromatic dicarboxylic acid is a member selected from the group consisting of terephthalic, isophthalic and phthalic acids, bi-benzoic acid, substituted dicarboxy compounds with two benzene nuclei such as bis(p-carboxyphenyl) methane, p-oxy(p-carboxyphenyl)benzoic acid, 2,6-naphthalene dicarboxylic acid, 1,5-naphthalene dicrboxylic acid, anthracene dicarboxylic acid and 4,4'-sulfonyl dibenzoic acid.

12. A thermoplastic blockcopolyetherester composition of claim 5 wherein said aliphatic and cycloaliphatic dicarboxylic acids are members selected from the group consisting of 1,4-cyclohexane dicarboxylic acid, 4'4-dicyclohexyl dicarboxylic acid, cyclopentane dicarboxylic acid, 1,3-cyclopentane dicarboxylic acid, adipic acid, sebacic acid, azelaic acid and dimeric acid.

13. A thermoplastic blockcopolyetherester composition of claim 5 wherein said diol used in the preparation of the blockcopolyetherester (A) is a member selected from the group consisting of diols with 2-15 carbon atoms such as ethylene, propylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxynaphthalene, bis(p-hydroxy)biphenyl, bis(p-hydroxyphenyl)methane and bis(p-hydroxyphenyl) propane.

14. A thermoplastic blockcopolyetherester composition of claim 8, wherein said long chain polyether unit of the blockcopolyetherester (A) comprises a glycol component, said glycol component being selected from the group consisting of poly(ethylene ether)glycol, poly(1,2- and 1,3-propylene ether)glycol, poly(tetramethylene ether)glycol, poly(1,2-butylene ether)glycol, poly(pentamethylene ether)glycol, poly(hexamethylene ether)glycol, poly(heptamethylene ether)glycol, poly(octamethylene ether)glycol, poly(nonamethylene ether)glycol.

* * * * *